Jan. 26, 1960  W. A. PENNY  2,922,313
PRESSURE SENSITIVE INSTRUMENTS
Filed July 14, 1954  2 Sheets-Sheet 1

INVENTOR
WILLIAM ALFRED PENNY
BY
Moore and Hall
ATTORNEYS

Jan. 26, 1960 W. A. PENNY 2,922,313
PRESSURE SENSITIVE INSTRUMENTS
Filed July 14, 1954 2 Sheets-Sheet 2

INVENTOR
WILLIAM ALFRED PENNY
BY
Moore and Hall
ATTORNEYS

United States Patent Office 2,922,313
Patented Jan. 26, 1960

2,922,313

PRESSURE SENSITIVE INSTRUMENTS

William A. Penny, Hillington, Glasgow, Scotland, assignor to Kelvin & Hughes Limited, Glasgow, Scotland, a British company Application July 14, 1954, Serial No. 443,396

Claims priority, application Great Britain July 14, 1953

11 Claims. (Cl. 74—393)

This invention relates to mechanical varying-ratio movement transmission apparatus whereby a given movement applied by hand or automatically to an input member can be transmitted to an output member at a varying rate, i.e. with a required varying ratio between them.

The invention is applicable to sensitive instruments, for example altimeters of the barometric type, having a pressure sensitive element responsive to changes in atmospheric pressure and actuating altitude indicating elements, a pressure datum indicator, and means for adjusting the relative setting between the datum indicator and the altitude indicating elements, according to the prevailing atmospheric pressure and in accordance with the law relating atmospheric pressure and height. An altimeter of this kind has been described in the specification of our British Patent No. 665,563, in which the indicator takes the form of a counter of the type known under the registered trademark "Veeder," and in which hand adjusting means effect adjustment of the datum indicator, according to a linear law, through a differential gear, through which also a non-linear correction is applied by means of a cam.

The invention is however applicable to other devices. For example, it can be used for deriving an output movement varying in relation to the input movement according to a logarithmic curve, or any other non-linear characteristics. The invention can be used for deriving from a multi-turn rate of input, a multi-turn output varying according to any required non-linear curve. Thus for an altimeter the varying ratio between input and output will follow the approximate logarithmic relationship of pressure with altitude (commonly referred to as the "I.C.A.N. characteristic").

The object of the present invention is to effect such adjustment by means which are more compact, of more simple construction, and increased reliability.

According to the present invention, the apparatus comprises co-axial rotary toothed wheels, gearing meshing with these wheels whereby they rotate relatively to each other, cam means comprising three elements, namely two cam elements co-axial with said wheels and a follower element, the latter co-acting with both cam elements, two of said elements being connected to said wheels and the other element being connected to an output member, an input member being operatively connected to the system consisting of said wheels and said gearing.

The invention will now be described by way of example with reference to the accompanying diagrammatic drawings wherein.

The term "cam" as used herein is intended to include an eccentric.

Figure 1:
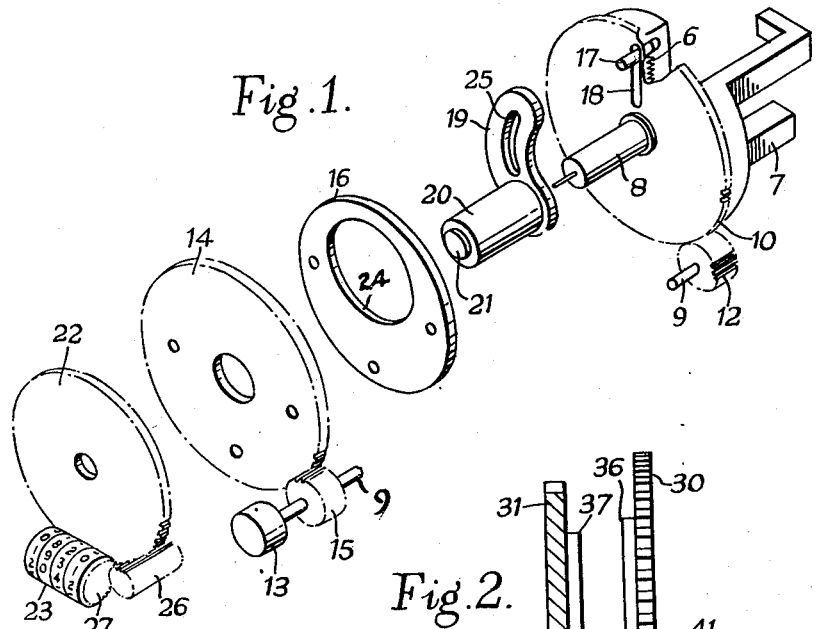
Figure 1 is a perspective exploded view of an apparatus made in accordance with the invention.

Referring first to Figure 1, wheels 10 and 14 are peripherally toothed and engaged respectively by two pinions 12 and 15. The wheels and/or pinions have a different number of teeth to provide a slightly different gear ratio between one wheel and its pinion, and the other wheel and its pinion. The pinions are fixed on a common spindle 9 that is provided with a knob 13 constituting an input member. The wheel 10 is carried rotatably by a suitable frame 7 and the latter also carries a fixed shaft 8 with a sleeve 20 on which the wheel 14 rotates. Between the two wheels and fixed to the wheel 14 is a cam plate 16 having an internal cam surface 24. Between the cam and the wheel 10 is an arm 19 having a cam slot 25 and carried by a sleeve 20 rotatably mounted on said shaft 8. The wheel 10 has a cam follower 17 in the form of a pin 17 that projects through a radial slot 18 in the wheel 10, passes through the cam slot 25 in the arm 19, and engages the cam surface 24 and is constrained against the cam by a spring 6. The sleeve 20 passes through the second wheel 14 and engages on the shaft 8. The sleeve 20 has a turned down end 21 on which is fixed a toothed wheel 22 that actuates a "Veeder" counter 23 through a pinion 26 and a contrate wheel 27. The slots 25 and 18 in the arm 19 and wheel 10 are of suitable shape in relation to each other such that as the wheels are rotated the cam follower pin 17 moves the slotted arm 19 in accordance with the rotary movement of the wheel 10 (which has a linear ratio with the knob 13) and in accordance with the cam following movement of the pin 17 which provides the non-linear adjustment, the combined movement being in accordance with a required law determined by the design of the cam elements 19, (25), 16, 17 and 18.

Figure 2:
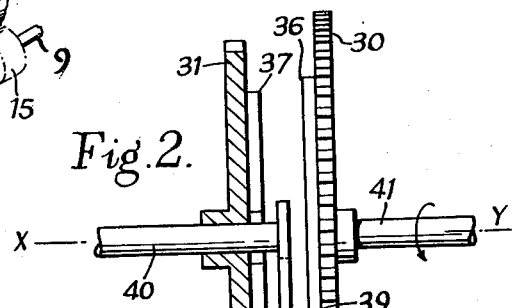
Figure 2 is an elevational view of a modified form of the apparatus.

Figure 2 shows a modification in which toothed wheels 30 and 31 of different sizes are geared together by a pair of pinions 32 and 33 which are fixed together on a common spindle 34. The wheels carry cams 36 and 37 which correspond to the parts 16 and 19 in Figure 1, and are engaged by a spring pressed follower 38 carried by an arm 39 which is fixed to an output spindle 40. The wheel 30 is fixed to a spindle 41 and the wheel 31 rides freely on the spindle 40. The input motion may be applied either to the spindle 41 or to the spindle 34. This motion is then varied according to a pre-determined curve by cam elements 37, 38 and 39 to give final output on the spindle 40 being a resultant of the rotary motion of the wheel 31 and the differential movement due to the cam elements. If desired the pinions 32 and 33 may be replaced by a planetary gear; also if desired the wheel 30 may be stationary and a direct input drive applied to the wheel 31. The cam follower 38 may be extended through the wheels 30 and 31 so that the arm 39 may be located on the outer side of the wheels.

Figure 3:
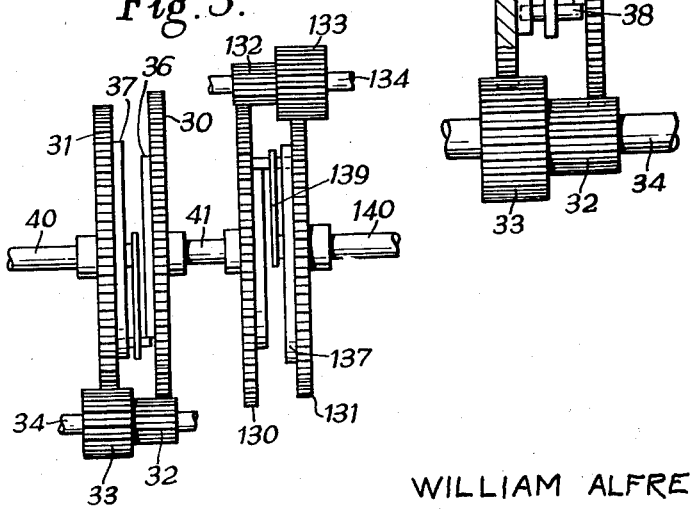
Figure 3 is an elevational view showing two such apparatus combined in series.
Figure 4:
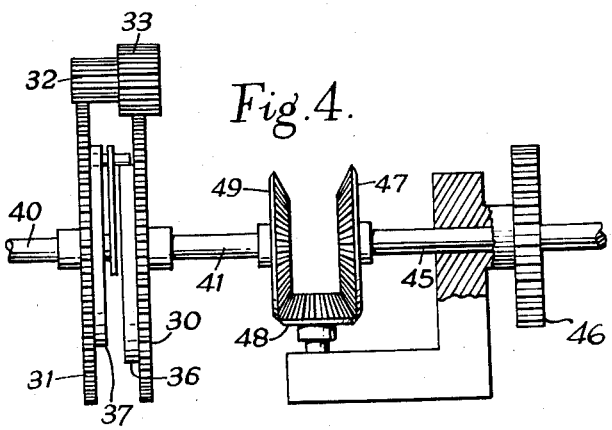
Figure 4 is an elevational view showing the apparatus having two input factors.

If desired two or more sets of apparatus as shown in Figure 2 may be operated in combination with each other; for example as shown in Figure 3 the spindle 41 is common to both apparatus. The parts of the apparatus on the right-hand side of the figure have similar numerals to the parts of the other apparatus but with the increase of one hundred. Thus the motions of the input spindle 140 are varied by both gear ratios and also by both sets of cam elements. By such arrangements comparatively complicated non-linear characteristics can be produced. Also the use of such multi-sets of apparatus facilitate minor adjustments of output either by changing one set or by changing its adjustment; for example by varying the position of the cam 137 in relation to the wheel 131 angularly about the axis of the spindle 140. In the modification shown in Figure 4 the wheel 30 is shown of smaller size than the wheel 31 and consequently the wheel 30 in this case gears with the larger of the two pinions namely 33. Movements representing two different factors are applied to the input spindle 41 one of the said movements being applied to the spindle 45 and the other to a spindle 46. These spindles carry bevelled gear wheels 47 and 48 which gear with each other, the pinion 48 also meshing with a gear wheel 49 on the spindle 41. This system may for example be used for an altimeter in which the movements are applied to the spindle 45 by a servo device which follows the movements of a capsule which varies according to a linear law with absolute pressure. The movements are applied to the spindle 46 according to ground pressure settings. The combined movements are applied to the spindle 41 and are modified by the cam elements. The final output may be in altitude units according to the I.C.A.N. system. The output from the spindle 40 may be applied to a pointer or pointers or counter or to a combination of these devices. The movements applied to the spindle 45 may be of the multi-turn type. If multi-rotation input is available from a servo-controlled differential pressure capsule which is connected to the pitot head of an aircraft, the output can incorporate the Bernoulli conversion to speed units, even including the compressibility corrections required at high speeds. It is possible to shape the cam elements in such manner as to give the position error correction for a particular type of aircraft for which the P.E.C. has been determined.

Figure 5:
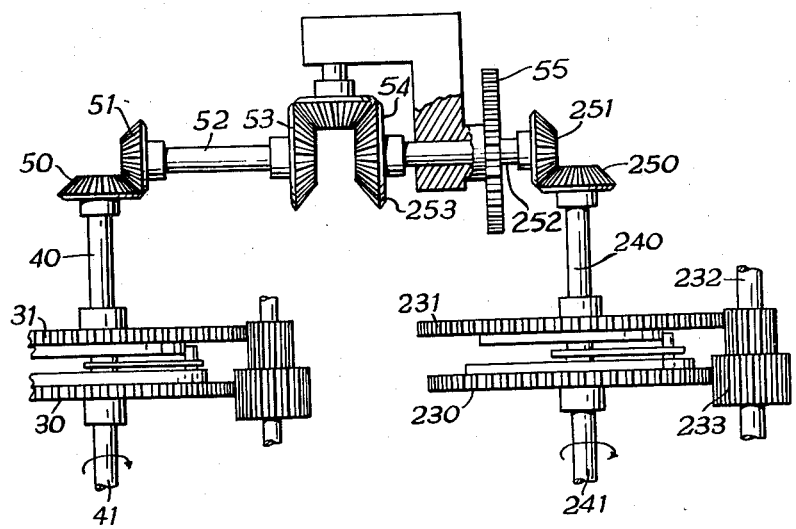
Figure 5 is an elevational view showing two such apparatus combined in parallel.

In the arrangement shown in Figure 5 two sets of apparatus are combined and in this case the parts of the right-hand set are marked with similar numerals increased by two hundred. The output spindles 40 and 240 carry bevelled pinions 50 and 250 meshing with similar pinions 51 and 251 on spindles 52 and 252 which carry bevelled gear wheels 53 and 253, meshing with a common output pinion 54 which drives an output spindle 55. The pinions 53, 54 and 253 thus constitute a differential gearing for combining the output motions of the two sets. An apparatus of this kind can be conveniently used for a machmeter. For this purpose the parts may have the following movements $$40 \log S$$
$$240 \log (P-S)$$
$$55 \log \left(\frac{P-S}{S}\right)$$

The inputs S and P represent static pressure and differential pressure respectively. The output can represent any required aircraft parameters such as Mach number, air speed, or true air speed by appropriate mechanical combinations of logarithmic outputs derived from the basic variations of static and absolute pressures and temperatures.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A mechanical varying ratio movement transmission apparatus comprising co-axial rotary toothed wheels, gearing meshing with these wheels whereby they rotate in the same direction at different speeds, cam means comprising three elements, namely two cam elements co-axial with said wheels and a follower element, the latter coacting with both cam elements, two of said elements being connected to said wheels and the other element being connected to an output member, an input member being operatively connected to the system consisting of said wheels and said gearing said follower element being carried by one of said wheels and is movable radially.

2. A mechanical varying ratio movement transmission apparatus comprising co-axial rotary toothed wheels, gearing meshing with these wheels whereby they rotate in the same direction at different speeds, cam means comprising three elements, namely two cam elements coaxial with said wheels and a follower element, the latter coacting with both cam elements, two of said elements being connected to said wheels and the other element being connected to an output member, an input member being operatively connected to the system consisting of said wheels and said gearing wherein the follower element is carried by one of said wheels and is movable radially, one cam element is an edge cam carried by the other wheel and adjusts the follower radially, and the other cam element is slotted to receive the follower and is connected to the output member.

3. An apparatus as claimed in claim 1 wherein the cam elements are carried by the wheels and the follower element is connected to the output member.

4. An apparatus as claimed in claim 1 wherein the gearing consists of two pinions of different sizes fixed to rotate together on a common axis and meshing with the wheels respectively.

5. A transmission mechanism comprising two of the apparatus as claimed in claim 1, the output from one of which drives the input of the other.

6. An apparatus as claimed in claim 1 wherein two members driven according to separate input factors are geared to the input member.

7. A transmission mechanism comprising two apparatus as claimed in claim 1, having their output members geared to a common final output, their input members being operated according to different factors.

8. A varying ratio movement transmission comprising a frame, a first cam mounted on said frame, a second cam mounted on said frame in axial alignment with and relatively movable with respect to said first cam, a cam follower movable in response to both said cams and mounted for movement with respect to the axis of said cams, an input member connected to drive one of said cams and said follower simultaneously, the other said cam providing an output means driven by said follower.

9. The combination set forth in claim 8, in which said follower comprises a single roller extending through a radially extending slot in one said cam.

10. The combination set forth in claim 9, an arm member having a curved surface and an axial extension, indicating means driven by said axial extension, said single roller follower engaging said curved surface providing an additional control variable.

11. A plurality of transmissions according to claim 10, a common output means connected to the output means of said transmissions and indicator means connected to said common output means.

References Cited in the file of this patent

UNITED STATES PATENTS

| | | |
|---|---|---|
| 309,722 | Maertens | Dec. 23, 1884 |
| 2,137,194 | Weber | Nov. 15, 1938 |
| 2,388,027 | Weil | Oct. 30, 1945 |
| 2,526,669 | Kellogg II et al. | Oct. 24, 1950 |
| 2,552,377 | Jenny | May 8, 1951 |
| 2,678,561 | Grandidge | May 18, 1954 |
| 2,703,932 | Norden | Mar. 15, 1955 |

FOREIGN PATENTS

| | | |
|---|---|---|
| 143,120 | Great Britain | May 20, 1920 |